US008397624B2

(12) United States Patent
Asai

(10) Patent No.: US 8,397,624 B2
(45) Date of Patent: Mar. 19, 2013

(54) HYDRAULIC ACTUATOR AND JOINT DRIVING UNIT EMPLOYING THE SAME

(75) Inventor: Katsuhiko Asai, Nara (JP)

(73) Assignee: Panasonic Corporation, Osaka (JP)

( * ) Notice: Subject to any disclaimer, the term of this patent is extended or adjusted under 35 U.S.C. 154(b) by 621 days.

(21) Appl. No.: 12/676,163

(22) PCT Filed: Jul. 9, 2009

(86) PCT No.: PCT/JP2009/003201
§ 371 (c)(1),
(2), (4) Date: Mar. 3, 2010

(87) PCT Pub. No.: WO2010/007746
PCT Pub. Date: Jan. 21, 2010

(65) Prior Publication Data
US 2010/0170241 A1   Jul. 8, 2010

(30) Foreign Application Priority Data

Jul. 18, 2008   (JP) ................................. 2008-186804

(51) Int. Cl.
*F01B 3/00* (2006.01)
(52) U.S. Cl. ............................................ 91/500; 91/499
(58) Field of Classification Search .............. 74/60, 839;
91/499, 502, 504, 505, 506, 507; 92/12.1, 92/71
See application file for complete search history.

(56) References Cited

U.S. PATENT DOCUMENTS

| 4,491,057 A * | 1/1985 | Ziegler ............................. 91/503 |
| 4,645,084 A * | 2/1987 | Deike ............................ 212/271 |
| 4,903,578 A | 2/1990 | Terp |
| 5,630,351 A | 5/1997 | Clucas |
| 6,647,813 B2 * | 11/2003 | Green ............................... 74/45 |

(Continued)

FOREIGN PATENT DOCUMENTS

| CN | 101014449 | 8/2007 |
| EP | 0 155 487 | 9/1985 |

(Continued)

OTHER PUBLICATIONS

Chinese Office Action issued Oct. 10, 2012 in CN 200980108449.7 which is a foreign counterpart to the present application (and its English translation).

(Continued)

*Primary Examiner* — Edward Look
*Assistant Examiner* — Logan Kraft
(74) *Attorney, Agent, or Firm* — Wenderoth, Lind & Ponack, LLP.

(57) ABSTRACT

There are provided a swash member and a first and second rotational members which are held on a base member through a universal joint mechanism and can rock about two axes out of three orthogonal axes including a center of the mechanism, a pump mechanism for transferring a low-pressure non-compressible fluid in a low-pressure pipe portion to a high-pressure pipe portion filled with a high-pressure non-compressible fluid being pressurized by a pressure accumulation mechanism, a control valve device which controls connection between both the pipe portions and a plurality of rocking-torque generation mechanisms which couple the base member and the swash member to each other and are driven by the fluids for generating a rocking torque to the swash member, and rocking-angle adjustment unit for changing a relative angle between the two rotational members.

20 Claims, 10 Drawing Sheets

U.S. PATENT DOCUMENTS

| | | | |
|---|---|---|---|
| 7,870,808 B2* | 1/2011 | Asai | 74/490.06 |
| 2007/0144299 A1 | 6/2007 | Okazaki | |
| 2009/0173178 A1 | 7/2009 | Okazaki | |
| 2009/0178552 A1* | 7/2009 | Kawamura et al. | 91/505 |

FOREIGN PATENT DOCUMENTS

| | | |
|---|---|---|
| JP | 60-164677 | 8/1985 |
| JP | 8-507353 | 8/1996 |
| JP | 9-507890 | 8/1997 |
| JP | 10-131901 | 5/1998 |
| JP | 2001-165155 | 6/2001 |
| JP | 2003-311667 | 11/2003 |
| WO | 94/27064 | 11/1994 |
| WO | 96/02735 | 2/1996 |

OTHER PUBLICATIONS

English translation of International Report on Patentability and Written Opinion of the International Searching Authority issued Feb. 17, 2011 in corresponding International Application No. PCT/JP2009/003201.

International Search Report issued Oct. 13, 2010 in International (PCT) Application No. PCT/JP2009/003201.

Collection of Papers "Biomechanism" published by Society of Biomechanisms, vol. 3, Japan, 1975, pp. 104-114, (with its partial translation).

* cited by examiner

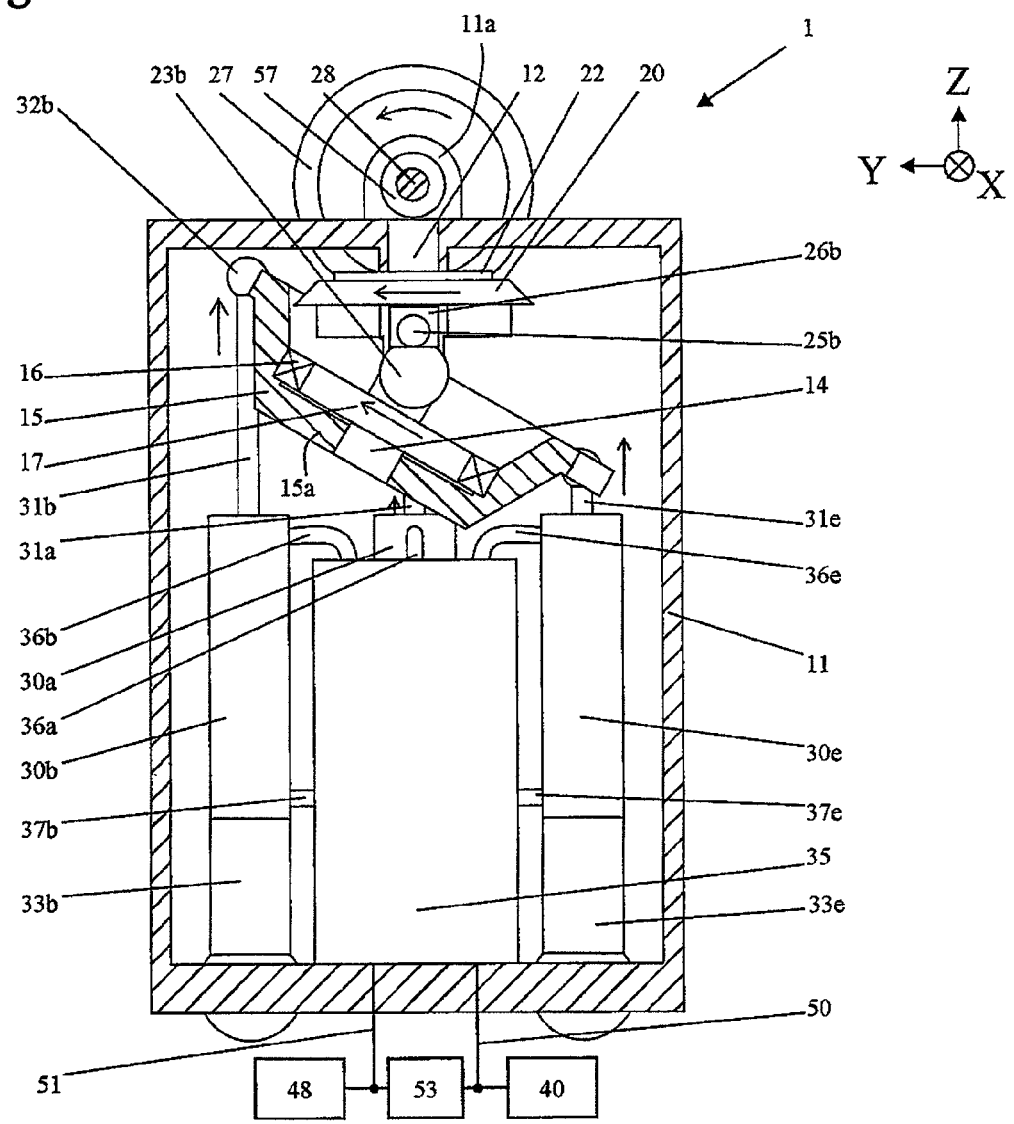

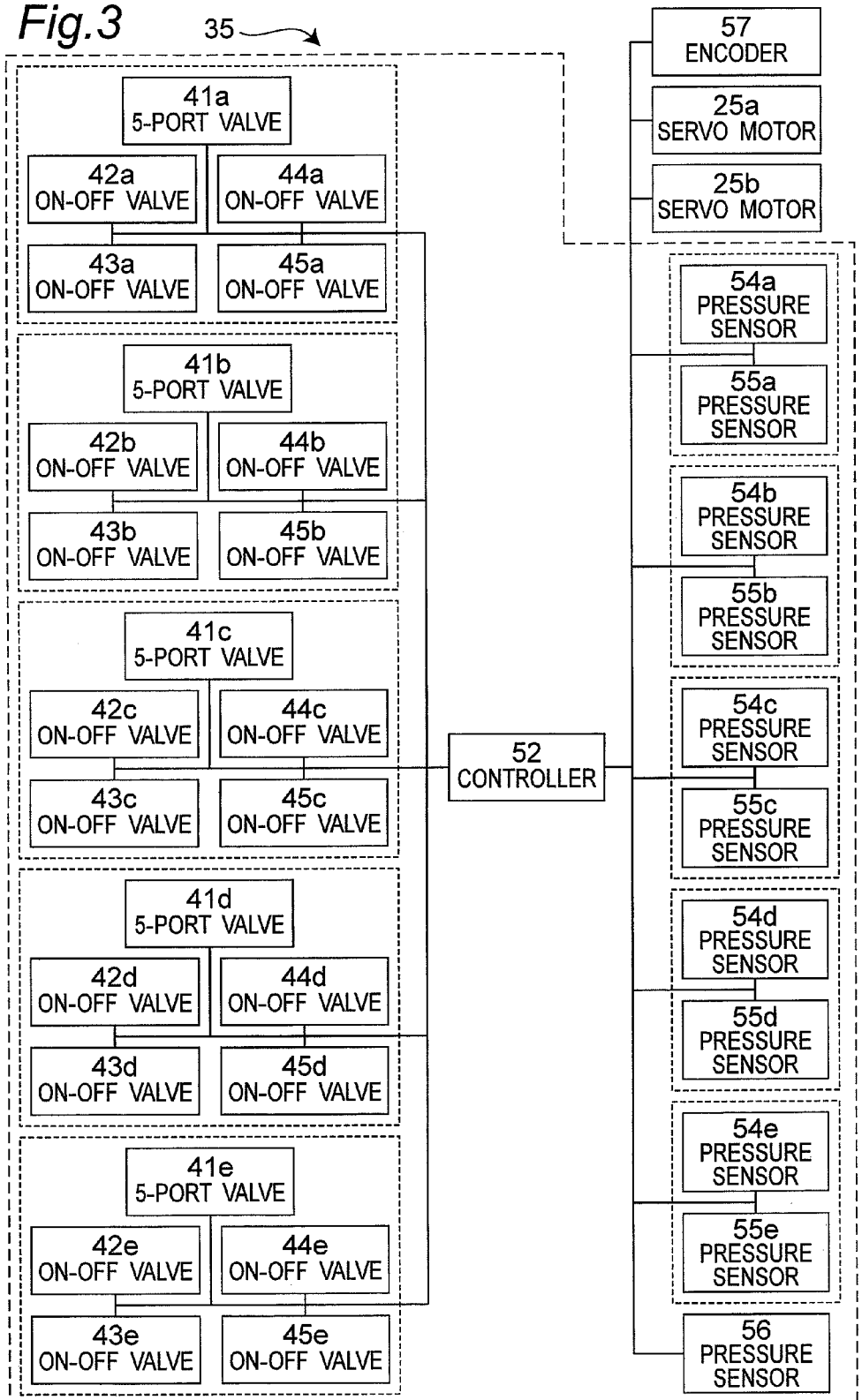

HYDRAULIC ACTUATOR AND JOINT DRIVING UNIT EMPLOYING THE SAME

TECHNICAL FIELD

The present invention relates to a hydraulic actuator with excellent operation efficiency, and a joint driving unit employing the same.

BACKGROUND ART

In recent years, there have been increasing expectations for robots operable in areas close to humans, such as medical robots, domestic service robots, and operation support robots in factories. For these robots, it is important to ensure safety in the event of occurrence of contact with a person, unlike industrial robots. This requires realization of all of power enabling operations and reduced weight and inertial and, further, requires joint driving actuators having high power-to-weight ratios. As examples of actuators which meet these requirements, there have been oil hydraulic actuators (refer to Non-patent Document 1, Patent Document 1, and Patent Document 2, for example). Oil hydraulic actuators are capable of driving at high pressures using a non-compressible fluid, which enables provision of higher power-to-weight ratios.

PRIOR ART DOCUMENTS

Patent Documents
    Patent Document 1: Japanese Unexamined Patent Publication No. 60-164677
    Patent Document 2: U.S. Pat. No. 4,903,578
Non-Patent Documents
    Non-patent Document 1: Collection of papers "Biomechanism" published by Society of Biomechanism, 1975, pages 104 to 114 in Vol. 3

SUMMARY OF THE INVENTION

Issues To Be Solved by the Invention

Oil hydraulic actuators employ oil which is a non-compressible fluid as a working fluid and, therefore, require pressurization means for generating a pressure. As the pressurization means, there have been generally employed pressurization methods using an oil hydraulic pump, but there is a need for continuously operating the pump for continuously generating a pressure. Therefore, in cases of maintaining operations which require a force but require no displacement, it is necessary to continuously consume energy by the pump, even though no energy is required to be transmitted to the outside. It can be considered that, in order to avoid such a situation, use of pressure accumulation means such as an accumulator is effective, but consumption of energy from the accumulator will depend on the amount of consumed oil. In cylinder-type or vane-type oil hydraulic actuators, a throttle is employed for adjusting the velocity, and such a structure employing a throttle vainly consumes energy within the accumulator, as losses, during operations at a lower velocity. Accordingly, such cylinder-type or vane-type oil hydraulic actuators have the problem that, under low-velocity and high-torque conditions as required for domestic robots, there is a need for an oil hydraulic pump and an accumulator of larger sizes and, also, there is a need for a cooling mechanism for suppressing heat generation due to loss, thereby inducing the problem of impossibility of increasing the power-to-weight ratio of the system.

On the other hand, variable-displacement axial piston-type oil hydraulic actuators are adapted to enable adjusting the output by changing the angle of a swash plate. Accordingly, these variable-displacement axial piston-type oil hydraulic actuators are capable of operating oil at a constant pressure, which can facilitate conjunction between the energy consumption by an accumulator and the output. However, axial-piston type oil hydraulic actuators operate with a limited number of pistons, which requires a large force for changing the angle of the swash plate, thereby inducing the problem of controllability.

Accordingly, in view of the above circumstances, it is an object of the present invention to provide a hydraulic actuator having excellent controllability and being capable of employing a pressurization unit with a reduced weight and, further, provide a joint driving unit employing the same.

Means for Solving the Issues

In order to attain the above object, there are provided the following structures, according to the present invention.

According to a first aspect of the present invention, there is provided a rotatable hydraulic actuator comprising:
    a base member;
    a swash member which is held with respect to the base member through a universal joint mechanism and is configured to be capable of rocking with respect to a first axis including a joint center of the universal joint mechanism being based on the base member;
    a first rotational member which is held rotatably with respect to the swash member about a second axis including the joint center of the universal joint mechanism being based on the swash member;
    a second rotational member which is held rotatably with respect to the first rotational member about a third axis being perpendicular to the second axis and including the joint center of the universal joint mechanism and is held rotatably about the first axis with respect to the base member;
    a high-pressure pipe portion filled with a non-compressible fluid being pressurized by a pressure accumulation mechanism;
    a low-pressure pipe portion filled with the non-compressible fluid while being maintained at a pressure lower than that of the non-compressible fluid in the high-pressure pipe portion;
    a pump mechanism which transfers the non-compressible fluid in the low-pressure pipe portion to the high-pressure pipe portion;
    a plurality of rocking-torque generation mechanisms which couple the base member and the swash member to each other and are driven by the non-compressible fluid to generate a rocking torque to the swash member, with the rocking-torque generation mechanisms being connected to the high-pressure pipe portion, the low-pressure pipe portion, and the pump mechanism;
    a control valve device which controls connection of the non-compressible fluid between the rocking-torque generation mechanisms and the high-pressure pipe portion as well as the low-pressure pipe portion; and
    a rocking-angle adjustment unit configured to change a relative angle between the first rotational member and the second rotational member about the third axis;
    wherein the control valve device controls such that the rocking-torque generation mechanisms generate the rocking torque about a fourth axis perpendicular to the first axis and the third axis, with respect to the swash member.

According to an eleventh aspect of the present invention, there is provided a joint driving unit which is driven by the hydraulic actuator according to any one of the first to tenth aspects.

EFFECTS OF THE INVENTION

Accordingly, in the present invention, it is possible to provide the hydraulic actuator having excellent controllability and also being capable of reducing the weight of the rocking-torque generation mechanisms and the pressurization unit such as the pressure accumulation mechanism, and to provide the joint driving unit employing the same. Specifically, the rotational torque which acts on the second rotational member is determined by the rocking torque about the fourth axis which acts on the swash member and by the relative angle between the first rotational member and the second rotational member which is adjusted by the rocking-angle adjustment unit. Accordingly, even at a state where the pressure of the non-compressible fluid in the high-pressure pipe portion is directly applied to the rocking-torque generation mechanisms to continuously generate a rocking torque about the fourth axis to the swash member to a maximum extent, it is possible to control the rotational torque which acts on the second rotational member through the rocking-angle adjustment unit, regardless of the rocking torque about the fourth axis. In this case, it is possible to directly drive, through the non-compressible fluid in the high-pressure pipe portion, the rocking-torque generation mechanisms other than some rocking-torque generation mechanisms which are used for the adjustment of the rocking torque about the third axis which acts on the swash member, which causes the energy removed from the pressure accumulation mechanism which pressurizes the high-pressure pipe portion to be conjunct with the energy applied to the outside of the hydraulic actuator, thereby preventing the pressure accumulation mechanism from vainly consuming energy. This enables reduction of the sizes of the pump mechanism and the pressure accumulation mechanism. Further, when work is applied from the outside to the hydraulic actuator according to the present invention, this energy is regenerated for the pressure accumulation mechanism along with the movement of the non-compressible fluid in the high-pressure pipe portion, which further reduces the energy consumed by the pressure accumulation mechanism, thereby enabling reduction of the size of the pump mechanism. Further, the control valve device controls the rocking torque about the third axis, such that the load for operations of the rocking-angle adjustment unit is reduced, which improves the responsivity of the rocking-angle adjustment unit, thereby improving the controllability.

BRIEF DESCRIPTION OF THE DRAWINGS

These and other objects and feathers of the present invention will become apparent from the following description of preferred embodiments regarding the attached drawings, in which:

FIG. 1E is a right-side cross-sectional view illustrating the general outline of the rotational actuator according to the first embodiment of the present invention, when it is driven;

FIG. 3 is a view illustrating the connection relationship between a controller in the valve mechanism and the respective components, in the rotational actuator according to the first embodiment of the present invention;

MODE FOR CARRYING OUT THE INVENTION

Figure 1A:
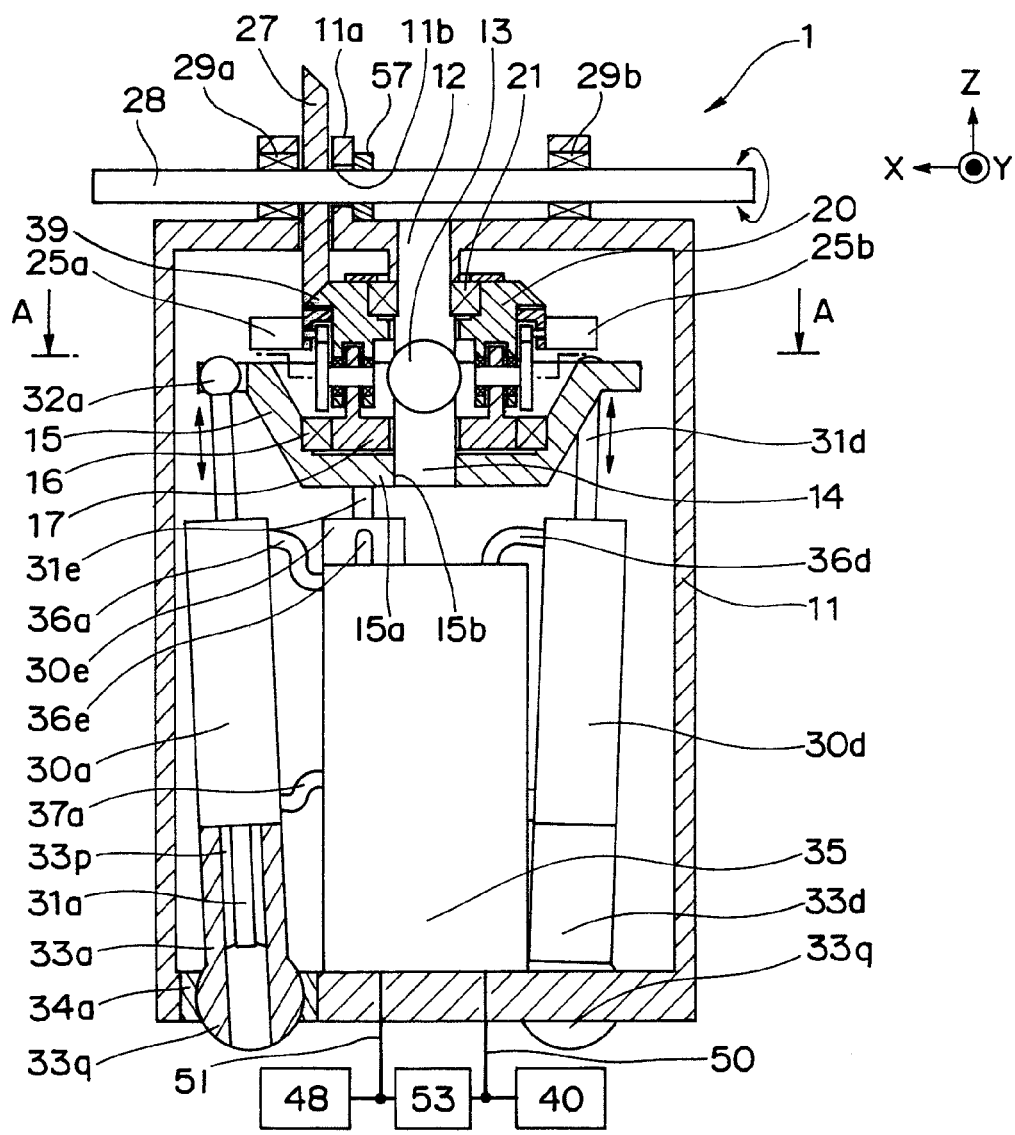
FIG. 1A is a front cross-sectional view illustrating the general outline of a rotational actuator according to a first embodiment of the present invention.

Hereinafter, embodiments of the present invention will be described in details with reference to the drawings.

Hereinafter, various types of aspects of the present invention will be described, before the detailed description of the embodiments of the present invention with reference to the drawings.

According to a first aspect of the present invention, there is provided a rotatable hydraulic actuator comprising:

a base member;

a swash member which is held with respect to the base member through a universal joint mechanism and is configured to be capable of rocking with respect to a first axis including a joint center of the universal joint mechanism being based on the base member;

a first rotational member which is held rotatably with respect to the swash member about a second axis including the joint center of the universal joint mechanism being based on the swash member;

a second rotational member which is held rotatably with respect to the first rotational member about a third axis being perpendicular to the second axis and including the joint center of the universal joint mechanism and is held rotatably about the first axis with respect to the base member;

a high-pressure pipe portion filled with a non-compressible fluid being pressurized by a pressure accumulation mechanism;

a low-pressure pipe portion filled with the non-compressible fluid while being maintained at a pressure lower than that of the non-compressible fluid in the high-pressure pipe portion;

a pump mechanism which transfers the non-compressible fluid in the low-pressure pipe portion to the high-pressure pipe portion;

a plurality of rocking-torque generation mechanisms which couple the base member and the swash member to each other and are driven by the non-compressible fluid to generate a rocking torque to the swash member, with the rocking-torque generation mechanisms being connected to the high-pressure pipe portion, the low-pressure pipe portion, and the pump mechanism;

a control valve device which controls connection of the non-compressible fluid between the rocking-torque generation mechanisms and the high-pressure pipe portion as well as the low-pressure pipe portion; and a rocking-angle adjustment unit configured to change a relative angle between the first rotational member and the second rotational member about the third axis;

wherein the control valve device controls such that the rocking-torque generation mechanisms generate the rocking torque about a fourth axis perpendicular to the first axis and the third axis, with respect to the swash member.

With the structure, the rotational torque which acts on the second rotational member is determined by the rocking torque about the fourth axis which acts on the swash member and by the relative angle between the first rotational member and the second rotational member which is adjusted by the rocking-angle adjustment unit. Accordingly, even at a state where the pressure of the non-compressible fluid in the high-pressure pipe portion is directly applied to the rocking-torque generation mechanisms to continuously generate a rocking torque about the fourth axis to the swash member to a maximum extent, it is possible to control the rotational torque which acts on the second rotational member through the rocking-angle adjustment unit, regardless of the rocking torque about the fourth axis. In this case, it is possible to directly drive, through the non-compressible fluid in the high-pressure pipe portion, the rocking-torque generation mechanisms other than some rocking-torque generation mechanisms which are used for the adjustment of the rocking torque about the third axis which acts on the swash member, which causes the energy removed from the pressure accumulation mechanism which pressurizes the high-pressure pipe portion to be conjunct with the energy applied to the outside of the hydraulic actuator, thereby preventing the pressure accumulation mechanism from vainly consuming energy. This enables reduction of the sizes of the pump mechanism and the pressure accumulation mechanism. Further, when work is applied from the outside to the hydraulic actuator according to the present invention, this energy is regenerated for the pressure accumulation mechanism along with the movement of the non-compressible fluid in the high-pressure pipe portion, which further reduces the energy consumed by the pressure accumulation mechanism, thereby enabling reduction of the size of the pump mechanism. Further, the control valve device controls the rocking torque about the third axis, such that the load for operations of the rocking-angle adjustment unit is reduced, which improves the responsivity of the rocking-angle adjustment unit, thereby improving the controllability. This enables provision of the hydraulic actuator having excellent controllability and being capable of employing the pressurization unit with a reduced weight.

According to a second aspect of the present invention, there is provided the hydraulic actuator according to the first aspect, wherein the universal joint mechanism is a constant-velocity joint mechanism.

With this structure, it is possible to reduce the variations of characteristics depending on the angle of the second rotational member, which facilitates the control of the rotational torque which acts on the second rotational member through the rocking-angle adjustment unit or the adjustment of the rocking torque about the third axis through the control valve device, thereby providing the hydraulic actuator with more excellent controllability.

According to a third aspect of the present invention, there is provided the hydraulic actuator according to any one of the first and second aspects, wherein the plurality of rocking-torque generation mechanisms are placed at equal intervals along a circumference about the second axis.

With this structure, it is possible to reduce the variations of characteristics depending on the angle of the second rotational member, which facilitates the control of the rotational torque which acts on the second rotational member through the rocking-angle adjustment unit or the adjustment of the rocking torque about the third axis through the control valve device, thereby providing the hydraulic actuator with more excellent controllability.

According to a fourth aspect of the present invention, there is provided the hydraulic actuator according to any one of the first to third aspects, wherein the rocking-torque generation mechanisms apply bidirectional rocking torques to the swash member.

With this structure, it is possible to generate a torque about the fourth axis which acts on the swash member, using the rocking-torque generation mechanisms positioned in any areas, out of areas within which the torque can be generated by pressing the swash member and areas within which the torque can be generated by pulling the swash member. This enables provision of the high-output hydraulic actuator.

According to a fifth aspect of the present invention, there is provided the hydraulic actuator according to the fourth aspect, comprising an odd number of the rocking-torque generation mechanisms, the odd number being equal to or more than 3.

With this structure, it is possible to place the respective rocking-torque generation mechanisms at asymmetric positions about the joint center, without increasing the variation of the intervals of the placement of the rocking-torque generation mechanisms. This can reduce the variation of the rocking torque depending on the angle of the second rotational member, thereby providing the hydraulic actuator with more-stabilized performance.

According to a sixth aspect of the present invention, there is provided the hydraulic actuator according to the fifth aspect, wherein a pressure of the non-compressible fluid which acts on the rocking-torque generation mechanisms, except the rocking-torque generation mechanism closest to the fourth axis, is a pressure of the non-compressible fluid in the high-pressure pipe portion or a pressure of the non-compressible fluid in the low-pressure pipe portion.

With this structure, it is possible to directly apply the pressure of the non-compressible fluid in the high-pressure pipe portion to the rocking-torque generation mechanisms other than a single rocking-torque generation mechanism, which can reduce the difference between the energy change in the pressure accumulation mechanism which pressurizes the high-pressure pipe portion and the energy transmission to and from the outside, thereby providing the hydraulic actuator with more excellent operation efficiency.

According to a seventh aspect of the present invention, there is provided the hydraulic actuator according to any one of the first to sixth aspects, wherein the rocking-torque generation mechanisms are piston-cylinder mechanisms.

With this structure, it is possible to make the forces generated by the rocking-torque generation mechanisms constant, regardless of their displacement, which enables provision the hydraulic actuator with more-stabilized performance.

According to an eighth aspect of the present invention, there is provided the hydraulic actuator according to the seventh aspect, wherein the piston-cylinder mechanisms are mechanisms employing double-rod type pistons.

With this structure, it is possible to reduce the variation in the magnitude of the rocking torque depending on the direction of the operation of the pistons, in cases where the rocking-torque generation mechanisms are operated through the pressure of the non-compressible fluid in the high-pressure pipe portion. This enables provision the hydraulic actuator with more-stabilized performance.

According to a ninth aspect of the present invention, there is provided the hydraulic actuator according to any one of the first to eighth aspects, wherein the rocking-torque generation mechanisms and the swash member are coupled to each other through ball joint mechanisms, and joint centers of the ball joint mechanisms exist in a plane being perpendicular to the second axis and including the third axis.

With this structure, it is possible to reduce the work to be performed by the rocking-angle adjustment unit, in changing the relative angle between the first rotational member and the second rotational member, thereby providing the hydraulic actuator with more excellent controllability.

According to a tenth aspect of the present invention, there is provided a multi-axes hydraulic actuator comprising a plurality of hydraulic actuators identical with that according to any one of the first to ninth aspects, wherein the respective hydraulic actuators share the common pump mechanism.

With this structure, it is possible to transfer, through a single pump mechanism, the non-compressible fluid from the low-pressure pipe portion to the high-pressure pipe portions in the plural hydraulic actuators, which averages the variations in the required amounts of the non-compressible fluid to be transferred thereto, thereby decreasing the variation in the amount of work by the pump mechanism with decreasing conjunction among the operations of the respective hydraulic actuators. This enables reduction of the size of the entire structure of the pump mechanism, thereby providing the hydraulic actuator employing the pressurization unit with a reduced weight.

According to an 11th aspect of the present invention, there is provided a joint driving unit comprising the hydraulic actuator according to any one of the first to tenth aspects which is placed in a joint portion coupling two arms to each other, wherein, with respect to one of the two arms, the hydraulic actuator drives another of the arms.

With this structure, it is possible to form the joint driving unit which is driven by the hydraulic actuator according to any one of the first to tenth aspects, thereby providing the joint driving unit capable of offering the effects and the advantages of the hydraulic actuator.

Hereinafter, various embodiments of the present invention will be described in details with reference to the drawings.

(First Embodiment)

Figure 1B:
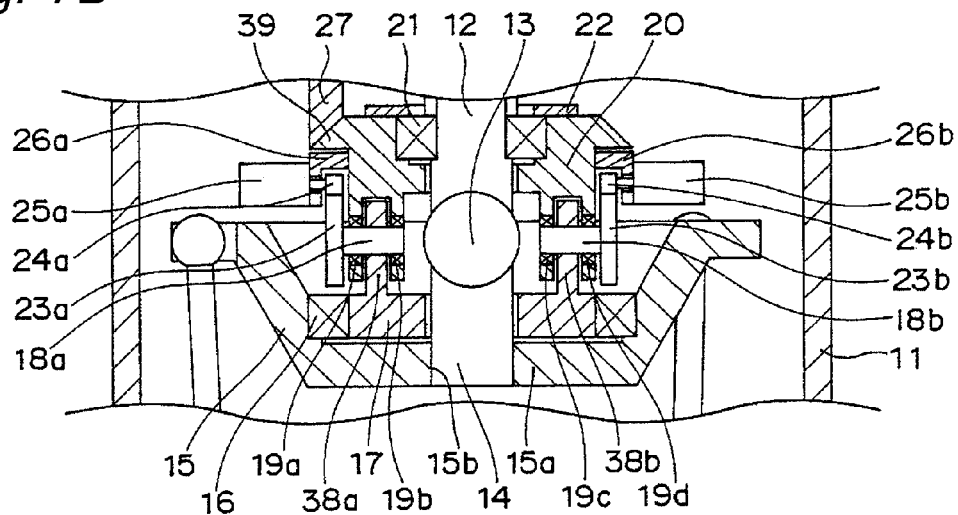
FIG. 1B is a partial enlarged view of a front cross-sectional view illustrating the general outline of the rotational actuator according to the first embodiment of the present invention.
Figure 1C:
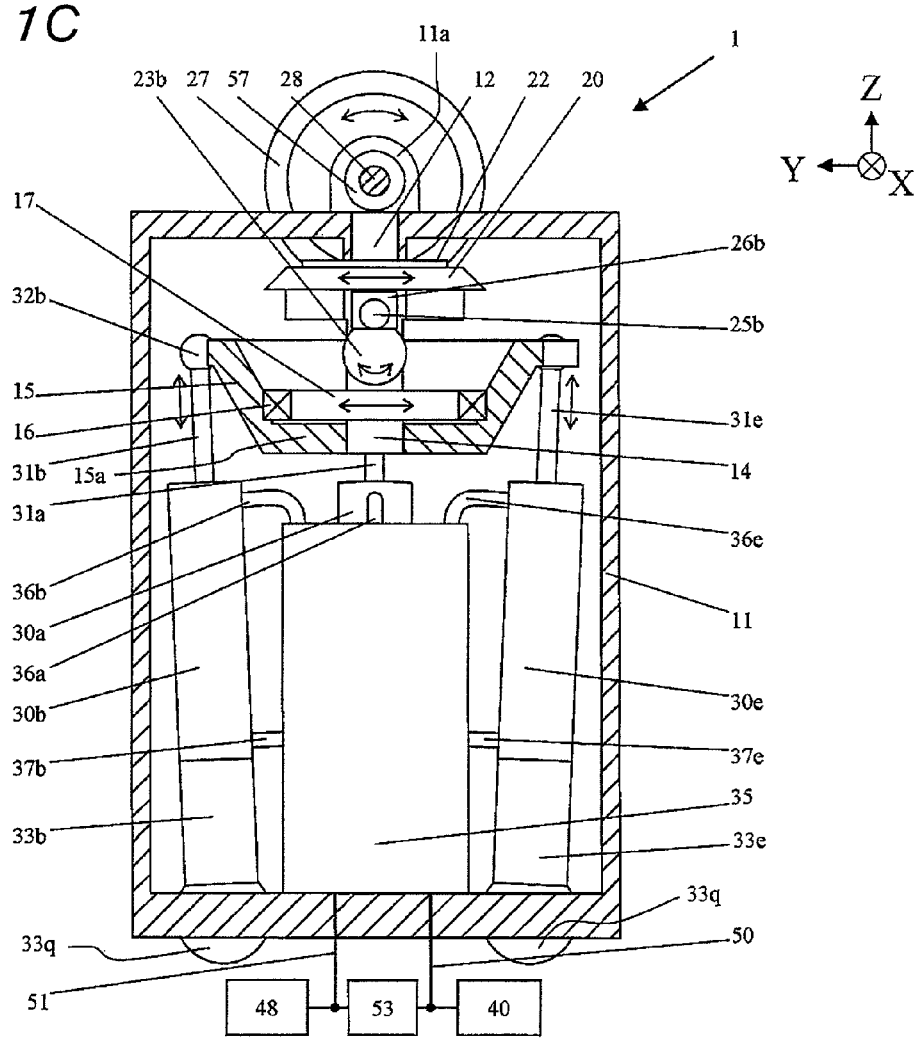
FIG. 1C is a right-side cross-sectional view illustrating the general outline of the rotational actuator according to the first embodiment of the present invention.
Figure 1D:
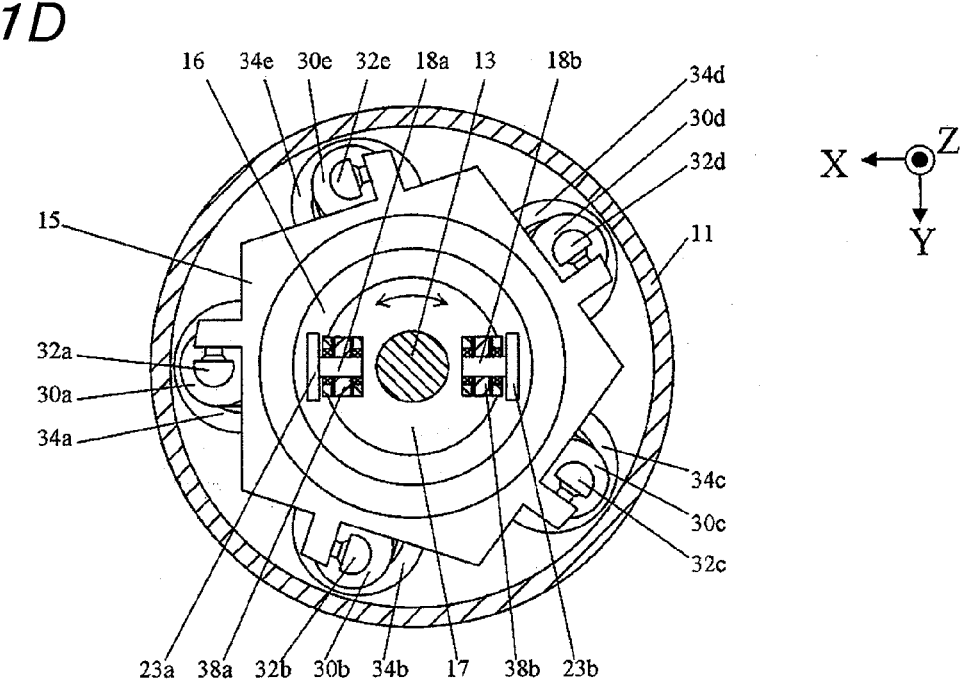
FIG. 1D is a cross-sectional view taken along the line A-A in FIG. 1A, illustrating the general outline of the rotational actuator according to the first embodiment of the present invention.

FIG. 1A is a front cross-sectional view illustrating the general outline of a rotational actuator 1 as an example of a hydraulic actuator according to a first embodiment of the present invention, and FIG. 1B is a partial enlarged view of the same. Further, FIG. 1C illustrates a right-side cross-sectional view of the rotational actuator 1, and FIG. 1D illustrates a cross-sectional view taken along the line A-A in FIG. 1A. As orthogonal coordinate axes for the rotational actuator according to the first embodiment, the upward direction in FIG. 1A is defined as a Z axis, the leftward direction is defined as an X axis, and the direction toward the viewer from the paper plane is defined a Y axis.

Referring to FIGS. 1A to 1D, a fixed shaft 12 having a center axis which functions as an example of a first axis (an imaginary axis) is secured to the center portion of the upper surface of a cylindrical frame 11 as an example of a base member. A rocking shaft 14 having a center axis which functions as an example of a second axis (an imaginary axis) is coupled to the fixed shaft 12, through a constant-velocity joint 13 as an example of a universal joint mechanism. As the constant-velocity joint 13, it is possible to employ a constant-velocity joint as one disclosed in JP-A No. 2002-349593, for example. The use of such a constant-velocity joint is desirable, since it will prevent the variation of the rotational torque depending on the direction of inclination of the rocking shaft 14. Further, a center plate portion 15a of a bowl-shaped member 15 having a pentagonal planer shape, as an example of a swash member, is secured, at an opening 15b therein, to the lower end of the rocking shaft 14, so that the rocking shaft 14 and the bowl-shaped member 15 can be operated to rock integrally with each other about the joint center of the constant-velocity joint 13. Further, the bowl-shaped member 15 is adapted to maintain a circular plate-shaped member 17, as an example of a first rotational member, in parallel with the center plate member 15a, through a bearing mechanism 16 which is placed on the upper surface of the center plate portion 15a of the bowl-shaped member 15 and is capable of holding a radial load and a thrust load, so that the plate-shaped member 17 can rotate relatively and coaxially with the center axis of the rocking shaft 14 with respect to the bowl-shaped member 15. As the bearing mechanism 16, it is possible to employ a cross roller bearing or a matched mounting angular contact ball bearing, for example. The plate-shaped member 17 is provided with two plate-shaped protrusions 38a and 38b spaced apart by 180 degrees from each other about the center axis of the rocking shaft 14, and shafts 18a and 18b are secured to the plate-shaped protrusions 38a and 38b, respectively. The shafts 18a and 18b are placed along the same axis, and the center axes of the shafts 18a and 18b are placed at positions passing through the joint center of the constant-velocity joint 13.

On the other hand, a rotational member 20 as an example of a second rotational member is held on the fixed shaft 12, such that the rotational member 20 can rotate about the center axis of the fixed shaft 12, through a bearing mechanism 21 which is placed on a midway step portion of the fixed shaft 12 and is capable of holding a radial load and a thrust load. The bearing mechanism 21 is secured to the rotational member 20 through a bearing holding member 22. Further, the rotational member 20 is also coupled to the shafts 18a and 18b through radial bearings 19a, 19b, 19c and 19d, so that the rotational member 20 can rotate relatively about the center axes of the shafts 18a and 18b having center axes which function as an example of a third axis (an imaginary axis) (about the X axis), with respect to the bowl-shaped member 15. Further, the rotation of the rotational member 20 is transmitted to a rotational shaft 28 which rotates integrally with a bevel gear 27, through the bevel gear 27 which is engaged orthogonally with a bevel gear portion 39 provided at the upper end of the rotational member 20. The rotational shaft 28 is held on the upper surface of the frame 11 through bearing mechanisms 29a and 29b, such that the rotational shaft 28 is rotatably penetrated through a through opening 11b in an upper end protrusion 11a in the frame 11 and is rotatable about the X axis. The rotational angle of the rotational shaft 28 with respect to the frame is measured by an encoder 57. The encoder 57 is connected to a controller (an example of control means or a control unit) 52 which will be described later, and the controller 52 determines the rotational angle of the rotational member 20 which operates in conjunction with the rotational shaft 28, from the rotational angle of the rotational shaft 28 which has been determined by the encoder 57.

Further, gears 23a and 23b are secured to the end surfaces of the shafts 18a and 18b, respectively. Further, L-shaped support members 26a and 26b are secured at their one ends to the side surface of the rotational member 20, and servo motors 25a and 25b as an example of rock-angle adjustment unit are held on the other ends of the L-shaped support members 26a and 26b. Gears 24a and 24b secured to the respective rotational shafts of the servo motors 25a and 25b are engaged with the gears 23a and 23b, respectively. Accordingly, by driving the servo motors 25a and 25b for rotating their respective rotational shafts and the gears 24a and 24b, with respect to the gear 23a and 23b, it is possible to change the relative angle between the rotational member 20 and the bowl-shaped member 15. If the relative angle between the rotational member 20 and the cup-shaped member 15 is changed, this causes the change from a state illustrated in FIG. 1C (a state where the rotational shaft core of the rotational member 20 is parallel with the rotational shaft core of the plate-shaped member 17 (in other words, a horizontal state where the center plate portion 15 of the bowl-shaped member 15 is positioned along a horizontal plane) to, for example, a state illustrated in FIG. 1E (a state where the rotational shaft core of the plate-shaped member 17 is inclined with respect to the rotational shaft core of the rotational member 20 (that is, an inclination state where the center plate portion 15a of the bowl-shaped member 15 is inclined with respect to a horizontal plane)). Further, information about the rotations of the servo motors 25a and 25b is inputted to the controller 52.

Further, double-rod type pistons 31a, 31b, 31c, 31d and 31e in oil hydraulic cylinders 30a, 30b, 30c, 30d and 30e as an example of a piston cylinder mechanism, which is an example of a rocking torque generating mechanism, are rotatably coupled, at their upper-rod upper ends, to the bowl-shaped member 15, at positions rotationally symmetric about the center axis of the fixed shaft 12 (more specifically, at positions at 72-degrees intervals along the same circumference about the center axis of the fixed shaft 12), through ball joints 32a, 32b, 32c, 32d and 32e placed on the side surface of the bowl-shaped member 15 at equal intervals (at positions at 72-degrees intervals) on a circumference about the rotational axis core of the bowl-shaped member 15. The use of such oil hydraulic cylinders is desirable, since they do not change their forces along with their displacement. Further, the use of such double-rod type pistons is desirable, since they do not induce variations in generated force depending on the direction of driving. Further, placement of them at rotationally-symmetrical positions is desirable, since it is possible to minimize the variations in characteristics, when the angle of the rotational member 20 is changed. Further, the joint centers of the ball joints 32a, 32b, 32c, 32d and 32e are positioned within a plane which is perpendicular to the center axis of the rocking shaft 14 and includes the center axes of the shafts 18a and 18b. This is desirable, since even if the inclination of the rotational axis core of the plate-shaped member 17 with respect to the rotational axis core of the rotational member 20 is changed, the position of the center of the circle which pass through the joint centers of the ball joints 32a, 32b, 32c, 32d and 32e is maintained constant, thereby inducing no extra imbalance in the bowl-shaped member 15. Further, the oil hydraulic cylinders 30a, 30b, 30c, 30d and 30e are secured, at their lower portions, to the upper ends of cylinder support members 33a, 33b, 33c, 33d and 33e which are provided at their lower end portions with ball-shaped portions 33q and also include, at center portions, respective through holes 33p for enabling the lower rods of the pistons 31a, 31b, 31c, 31d and 31e to pass therethrough. The ball-shaped portions 33q at the lower ends of the cylinder support members 33a, 33b, 33c, 33d and 33e are rotatably supported by ball holders 34a, 34b, 34c, 34d and 34e which are secured to the bottom surface of the lower end of the frame 11, respectively, to constitute ball joints.

On the other hand, upper connection pipes 36a, 36b, 36c, 36d and 36e and lower connection pipes 37a, 37b, 37c, 37d and 37e for supplying oil, as an example of a non-compressible fluid, are connected to the upper side surface and the lower side surface of the oil hydraulic cylinders 30a, 30b, 30c, 30d and 30e, respectively, such that a valve mechanism 35, as an example of a control valve device, is connected to the oil hydraulic cylinders 30a, 30b, 30c, 30d and 30e, through the upper connection pipes 36a, 36b, 36c, 36d and 36e and the lower connection pipes 37a, 37b, 37c, 37d and 37e, respectively. The valve mechanism 35 has an interval structure as illustrated in a piping diagram of FIG. 2. Further, the valve mechanism 35 is provided with the controller 52, and the controller 52 and the respective components illustrated in FIG. 2 are connected to one another in the manner illustrated in FIG. 3.

Figure 2:
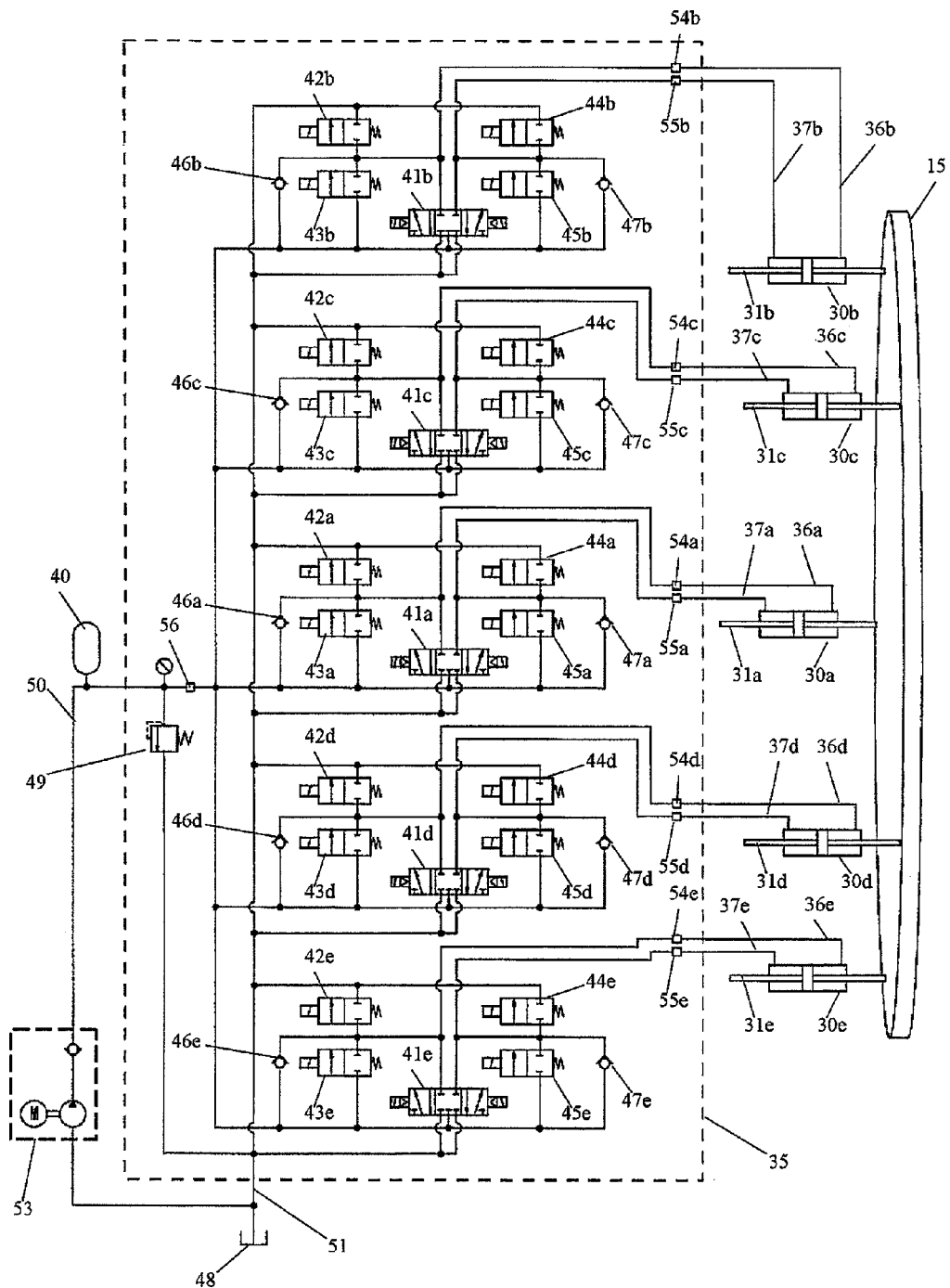
FIG. 2 is a piping diagram illustrating the internal structure of a valve mechanism in the rotational actuator according to the first embodiment of the present invention.
Figure 4A:
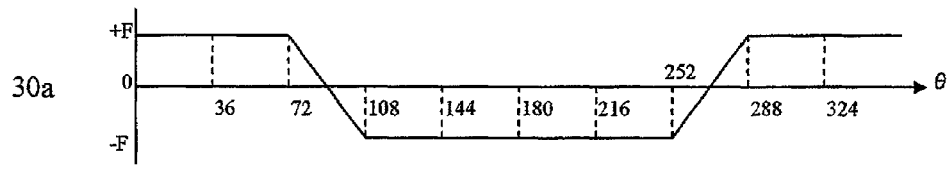
FIG. 4A is a view illustrating the change of the force generated by an oil hydraulic cylinder $30a$ under the control of the controller in the rotational actuator according to the first embodiment of the present invention.
Figure 4B:
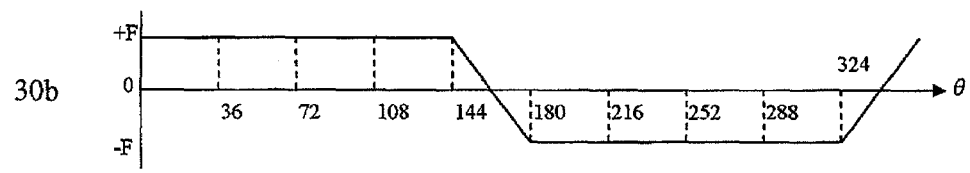
FIG. 4B is a view illustrating the change of the force generated by an oil hydraulic cylinder $30b$ under the control of the controller in the rotational actuator according to the first embodiment of the present invention.
Figure 4C:
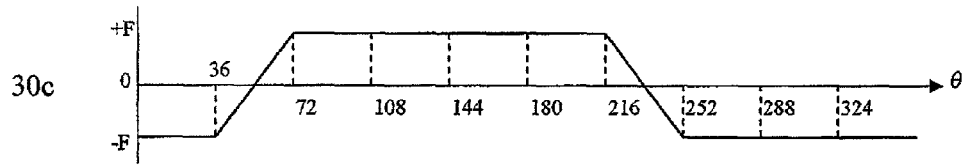
FIG. 4C is a view illustrating the change of the force generated by an oil hydraulic cylinder $30c$ under the control of the controller in the rotational actuator according to the first embodiment of the present invention.
Figure 4D:
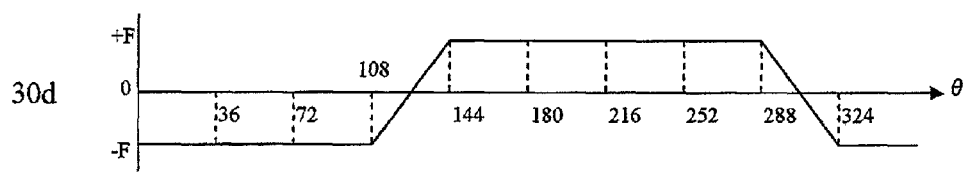
FIG. 4D is a view illustrating the change of the force generated by an oil hydraulic cylinder $30d$ under the control of the controller in the rotational actuator according to the first embodiment of the present invention.
Figure 4E:
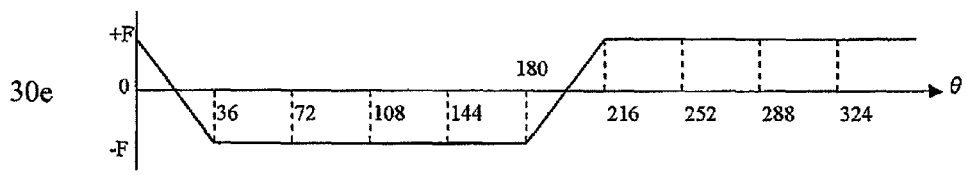
FIG. 4E is a view illustrating the change of the force generated by an oil hydraulic cylinder $30e$ under the control of the controller in the rotational actuator according to the first embodiment of the present invention.

Referring to FIG. 2, 5-port valves 41a, 41b, 41c, 41d and 41e are connected to the upper connection pipes 36a, 36b, 36c, 36d and 36e and the lower connection pipes 37a, 37b, 37c, 37d and 37e, respectively, in such a way as to change over between the connections between the oil hydraulic cylinders 30a, 30b, 30c, 30d and 30e and a high-pressure pipe 50 as an example of a high-pressure pipe portion and a low-pressure pipe 51 as an example of a low-pressure pipe portion. The low-pressure pipe 51 is filled with a non-compressible fluid maintained at a lower pressure than that of the non-compressible fluid within the high-pressure pipe 50. An accumulator 40, as an example of a pressure accumulation mechanism, is connected to the high-pressure pipe 50, so that the energy accumulated therein compresses the oil within the high-pressure pipe 50. The type of the accumulator 40 is not particularly limited, and it is possible to employ various types of conventionally-known accumulators. More specifically, it is possible to employ, for example, a bladder-type accumulator, a piston-type accumulator, or a diaphragm-type accumulator, as the accumulator 40. Further, the upper connection pipes 36a, 36b, 36c, 36d and 36e are connected to the low-pressure pipe 51 which extends to an oil tank 48, through ON/OFF valves 42a, 42b, 42c, 42d and 42e, respectively, and, further, are connected to the high-pressure pipe 50, through ON/OFF valves 43a, 43b, 43c, 43d and 43e and check valves 46a, 46b, 46c, 46d and 46e, respectively. Similarly, the lower connection pipes 37a, 37b, 37c, 37d and 37e are connected to the low-pressure pipe 51 which extends to the oil tank 48, through ON/OFF valves 44a, 44b, 44c, 44d and 44e, respectively, and, further, are connected to the high-pressure pipe 50, through ON/OFF valves 45a, 45b, 45c, 45d and 45e and check valves 47a, 47b, 47c, 47d and 47e, respectively. The controller 52 is connected to the 5-port valves 41a, 41b, 41c, 41d and 41e, the ON/OFF valves 42a, 42b, 42c, 42d and 42e, the ON/OFF valves 43a, 43b, 43c, 43d and 43e, the ON/OFF valves 44a, 44b, 44c, 44d and 44e, and the ON/OFF valves 45a, 45b, 45c, 45d and 45e, such that the controller 52 can control the operations of the respective ON/OFF valves.

Further, the high-pressure pipe 50 is connected to the low-pressure pipe 51 through a relief valve 49, which protects the accumulator 40 and the high-pressure pipe 50 in such a way as to prevent the pressures in the accumulator 40 and the high-pressure pipe 50 from becoming equal to or higher than a certain pressure. On the contrary, an oil hydraulic pump 53 including a check valve, as an example of a pump mechanism, is provided between the low-pressure pipe 51 and the high-pressure pipe 50, which enables transferring the oil in the low-pressure pipe 51 to the high-pressure pipe 50 through the oil hydraulic pump 53. Further, pressure sensors 54a, 54b, 54c, 54d and 54e are provided halfway through the upper connection pipes 36a, 36b, 36c, 36d and 36e, respectively, which enables measuring the pressures in the upper connection pipes. Similarly, pressure sensors 55a, 55b, 55c, 55d and 55e are provided halfway through the lower connection pipes 37a, 37b, 37c, 37d and 37e, respectively, and a pressure sensor 56 is provided halfway through the high-pressure pipe 50, which enables measuring the pressures in the respective pipes. The controller 52 is connected to the pressure sensors 54a, 54b, 54c, 54d and 54e, the pressure sensors 55a, 55b, 55c, 55d and 55e and the pressure sensor 56, so that information about the pressures in the respective pipes which have been determined by the respective sensors can be inputted to the controller 52.

Next, there will be described the effects of the rotational actuator 1 which are realized under the control of the controller 52 included in the valve mechanism 35.

The force which acts on the rotational shaft 28 in the rotational actuator 1 is determined by the forces generated by the oil hydraulic cylinders 30a, 30b, 30c, 30d and 30e and by the magnitude of the inclination of the rotational shaft core of the plate-shaped member 17 with respect to the rotational shaft core of the rotational member 20. Specifically, referring to FIG. 1C, when the forces generated by the oil hydraulic cylinders 30a, 30b, 30c, 30d and 30e act on the bowl-shaped member 15, the displacements in the respective directions along the X axis, the Y axis and the Z axis and the rotation about the Z axis are restricted, since the bowl-shaped member 15 is coupled to the rocking shaft 14 and to the fixed shaft 12 through the constant-velocity joint 13. The rotational torque about the X axis which acts on the bowl-shaped member 15 is transmitted to the bearing mechanism 16, the plate-shaped member 17, the plate-shaped protrusions 38a and 38b which rotate integrally with the plate-shaped member 17, the shafts 18a and 18b, the gears 23a and 23b, and also to the servo motors 25a and 25b through the gears 24a and 24b. Further, the rotational torque about the Y axis which acts on the bowl-shaped member 15 is transmitted to the bearing mechanism 16, the plate-shaped member 17, and the rotational member 20 through the shafts 18a and 18b. At the state of FIG. 10, the center plate portion 15a of the bowl-shaped member 15 is maintained at a horizontal state and, therefore, only the rotational torque about the Y axis acts on the rotational member 20. Since the rotation of the rotational member 20 about the Y axis is restricted by the bearing mechanism 21, the state of the rotational member 20 is not changed at the state of FIG. 1C.

On the other hand, at an inclination state in FIG. 1E where the center plate portion 15a of the bowl-shaped member 15 is inclined from the horizontal state, the rotational torque about the Y axis which acts on the bowl-shaped member 15 (a torque as an example of a rocking torque) is decomposed into a rotational torque about the Y axis which acts on the rotational member 20 and a rotational torque about the Z axis. The bowl-shaped member 15 is capable of only operating to rock about a rock center, with the rock center being the joint center of the constant-velocity joint 13. And, applying a rotation about the Y axis thereto at an inclination state where the bowl-shaped member 15 has been inclined about the X axis as in FIG. 1E is equal to rotating the direction of the inclination of the bowl-shaped member 15 about the Z axis. On the other hand, due to the restriction by the rotational member 20, the center axes of the shafts 18a and 18b can exist in an X-Y plane including the joint center of the constant-velocity joint 13, and therefore, if the direction of the inclination of the bowl-shaped member 15 is changed, this rotates the shafts 18a and 18b and the rotational member 20 about the Z axis, along therewith. Therefore, the rotational torque about the Y axis which acts on the bowl-shaped member 15 induces a rotational torque about the Z axis which acts on the rotational member 20. Specifically, the servo motors 25a and 25b fix the inclination of the plate-shaped member 17, and also the valve mechanism 35 controls the forces generated by the respective oil hydraulic cylinders 30a, 30b, 30c, 30d and 30e, such that a certain torque acts on the bowl-shaped member 15 about an axis (an imaginary axis as an example of a fourth axis perpendicular to the third axis) which is perpendicular to the center axes of the shafts 18a and 18b in an X-Y plane (hereinafter, referred to as about Y' axis), so that a certain torque about the Z axis acts on the rotational member 20. The torque about the Z axis which acts on the rotational member 20 is changed with the inclination of the plate-shaped member 17, so that the torque is 0 at a horizontal state where there is no inclination as in FIG. 1C, and is increased with increasing inclination of the plate-shaped member 17 at an inclination state as illustrated in FIG. 1E. On the other hand, the torque about the Z axis which acts on the rotational member 20 is transmitted to the bevel gear portion 39 in the rotational member 20 and to the rotational shaft 28 through the bevel gear 27, which forms a torque generated by the rotational actuator 1.

Next, operations of the valve mechanism 35 will be described. As illustrated in FIG. 3, the valve mechanism 35 is a mechanism which controls the valves based on information from plural sensors for controlling the forces generated by the respective oil hydraulic cylinders 30a, 30b, 30c, 30d and 30e. The controller 52 determines the rotational angle of the rotational member 20 which operates in conjunction with the rotational shaft 28, from the rotational angle of the rotational shaft 28 which has been measured by the encoder 57 and, also, obtains information about the inclination of the plate-shaped member 17 and the bowl-shaped member 15 from information about the rotations of the servo motors 25a and 25b. FIGS. 4A to 4E illustrate an example of the relationship between the angle of the rotational member 20 and the forces generated by the respective oil hydraulic cylinders 30a, 30b, 30c, 30d and 30e, which is controlled by the controller 52. Referring to FIGS. 4A to 4E, the horizontal axis represents, by the degree (°), an angle θ which represents the rotational angle of the rotational member 20, wherein the direction of rightward screwing about the Z axis is defined as the positive direction, such that θ equals to 0 degree at the state of FIG. 1E. The vertical axis represents the force generated by each of the oil hydraulic cylinders 30a, 30b, 30c, 30d and 30e, wherein the direction along the Z axis is defined as the positive direction. Further, "+F" on the vertical axis indicates a state where the pressure of the high-pressure pipe 50 is applied to each lower connection pipe 37a, 37b, 37c, 37d, 37e, that is a state where each of the 5-port valves 41a, 41b, 41c, 41d and 41e in FIG. 2 has been moved in the leftward direction. Similarly, "−F" on the vertical axis represents a state where the pressure of the high-pressure pipe 50 is applied to each upper connection pipe 36a, 36b, 36c, 36d and 36e, that is a state where each of the 5-port valves 41a, 41b, 41c, 41d and 41e in FIG. 2 has been moved in the rightward direction. Further, when the force generated by each oil hydraulic cylinder 30a, 30b, 30c, 30d, 30e is midway between "+F" and "−F", each of the 5-port valves 41a, 41b, 41c, 41d, 41e is positioned as in FIG. 2, thereby realizing a state where the pressure control is performed by each ON/OFF valve 42a, 42b, 42c, 42d, 42e and by each ON/OFF valve 43a, 43b, 43c, 43d, 43e. At the state of FIG. 1E, when the forces generated by the respective oil hydraulic cylinders 30a, 30b, 30c, 30d and 30e are changed as in FIGS. 4A to 4E, a rotational torque in the direction of leftward screwing about the Z axis acts on the rotational member 20. When the inclination of the bowl-shaped member 15 is constant, the torque about the Y' axis which acts on the bowl-shaped member 15 is varied by about 5%, but is maintained substantially at constant, regardless of the angle of the rotational member 20. On the other hand, the torque about the center axes of the shafts 18a and 18b which acts on the bowl-shaped member 15 is about zero, which causes no load to be applied to the servo motors 25a and 25b. The torque about the center axes of the shafts 18a and 18b can be linearly changed as in FIGS. 4A to 4E, but it is desirable that it is changed in the way of $\pm F \times \tan(\Delta\theta)/\tan(180°/(n \times 2))$, since it is possible to make the torque about the center axes of the shafts 18a and 18b closer to zero. In this case, $\Delta\theta$ is the difference from the angle which makes the generated force zero in FIGS. 4A to 4E, "n" is the number of cylinders, and n equals to 5 in the first embodiment. The "+" symbol indicates a case where the generated force is changed diagonally right up in FIGS. 4A to 4E, while the "−" symbol indicates a case where the generated force is changed diagonally right down therein. Further, in the case of the oil hydraulic cylinder 30a in FIG. 4A, it is desirable to realize $-F \times \tan(\theta-90°)/\tan(18°)$ within the range of θ of from 72° to 108°, and to realize $F \times \tan(\theta-270°)/\tan(18°)$ within the range of θ of from 252° to 288°. In the first embodiment, n equals to 5, and an odd number of oil hydraulic cylinders are bidirectionally operated, which is desirable, since it is possible to generate bidirectional torques (bidirectional rocking torques) along the five directions, with respect to the bowl-shaped member 15. For example, in cases of six oil hydraulic cylinders evenly spaced apart from one another, even if they are bidirectionally operated, it is possible to generate bidirectional torques along only three directions. Further, while in the first embodiment, n equals to 5, n can be increased for reducing the variation of the torque about the Y' axis. However, if the numerical value of n is excessively large, this complicates the structure. Accordingly, it is desirable that the numerical value of n is an odd number equal to or larger than 3, preferably an odd number of about 5, 7, 9 or 11.

At a state where the valve mechanism 35 controls the forces generated by the respective oil hydraulic cylinders 30a, 30b, 30c, 30d and 30e as described above, it is possible to operate the servo motors 25a and 25b for changing the inclination of the plate-shaped member 17 to freely change the torque generated by the rotational actuator 1, including changing the direction thereof. The torque required for operating the servo motors 25a and 25b is influenced by the torque about the center axes of the shafts 18a and 18b which is caused by the forces generated by the respective oil hydraulic cylinders 30a, 30b, 30c, 30d and 30e. And, it is possible to reduce the torque required for the servo motors 25a and 25b (in other words, it is possible to reduce the loads for operations of the servo motors 25a and 25b, as an example of the rocking-angle adjustment unit), by reducing the torque about the center axes of the shafts 18a and 18b under the control of the valve mechanism 35. Further, in the case where the angle of the rotational angle 20 is an angle which is not subjected to the pressure control by the valve mechanism 35, such as 36°, 72°, 108° in FIGS. 4A to 4E, no energy consumption along with the pressure control is required, even when the servo motors 25a and 25b are operated. Accordingly, it is desirable to operate the servo motors 25a and 25b at such an angle, if at all possible, in view of the efficiency of operations of the rotational actuator 1.

On the other hand, the torque generated by the rotational actuator 1 depends on the torque about the Y' axis which acts on the bowl-shaped member 15, and most of the torque about the Y' axis is generated by the oil hydraulic cylinder which is directly subjected to the pressure of the high-pressure pipe 50. Specifically, in the case where the forces generated by the respective oil hydraulic cylinders 30a, 30b, 30c, 30d and 30e are changed as in FIGS. 4A to 4E, only the oil hydraulic cylinder closest to the Y' axis (for example, the oil hydraulic cylinder 30e in the case where θ is in the range of 0 to 36 degrees) is under the pressure control, and the force generated by this oil hydraulic cylinder exerts only a small influence on the torque about the Y' axis, since it is closest to the Y' axis. Accordingly, when the rotational actuator 1 rotates in the direction of the torque generation (the rotational shaft 28 rotates in the direction of leftward screwing about the X axis) for applying work to the outside of the rotational actuator 1, energy equal to the energy outputted to the outside is consumed from the energy contained in the accumulator 40, along with the movement of oil within the high-pressure pipe 50. On the contrary, when the rotational actuator 1 is rotated in the direction opposite from the direction of the torque generation (the rotational shaft 28 is rotated in the direction of rightward screwing about the X axis) for applying work thereto from the outside of the rotational actuator 1, energy equal to the energy inputted from the outside is directly added to the energy contained in the accumulator 40, along with the movement of oil within the high-pressure pipe 50. As described above, the rotational actuator 1 is capable of automatically changing over between driving and regeneration depending on the direction of its rotation, which can further reduce the energy consumed by the accumulator 40. Further, the energy removed from the accumulator 40 due to operations of the rotational actuator 1 can be compensated by the oil hydraulic pump 53. In this case, if the regeneration effectively works and the average power is largely reduced in comparison with the output peak power during the operation of the rotational actuator 1, it is possible to perform, for a long time, compensation for the energy which has been outputted from the accumulator 40 within a short time, which allows the oil hydraulic pump 53 to have low performance, thereby enabling reduction of the size of the oil hydraulic pump 53.

Accordingly, with the first embodiment, it is possible to reduce the weights of the oil hydraulic cylinders 30a, 30b, 30c, 30d and 30e as an example of the rocking-torque generation mechanism and the pressurization unit such as the accumulator 40 as an example of the pressure accumulation mechanism and, also, it is possible to provide the hydraulic actuator 1 with excellent controllability and a joint driving unit 71 using the same. Specifically, the rotational torque which acts on the rotational member 20, as an example of the second rotational member, is determined by the rocking torque about the fourth axis which acts on the bowl-shaped member 15 as an example of the swash member, and by the relative angle between the rotational member 20 and the plate-shaped member 17 as an example of the first rotational member which is adjusted by the servo motors 25a and 25b as an example of the rocking-angle adjustment unit. Accordingly, even at a state where the pressure of the oil, as an example of the non-compressible fluid, in the high-pressure pipe 50 as an example of the high-pressure pipe portion is directly applied to the oil hydraulic cylinders 30a, 30b, 30c, 30d and 30e to continuously generate a rocking torque about the fourth axis to the bowl-shaped member 15 to a maximum extent, it is possible to control the rotational torque which acts on the rotational member 20 through the servo motors 25a and 25b, regardless of the rocking torque about the fourth axis. In this case, it is possible to directly drive, through the oil in the high-pressure pipe 50, the oil hydraulic cylinders other than some oil hydraulic cylinders 30a, 30b, 30c, 30d and 30e which are used for the adjustment of the rocking torque about the third axis (for example, the center axes of the shafts 18a and 18b) which acts on the bowl-shaped member 15, which causes the energy removed from the accumulator 40 which pressurizes the high-pressure pipe 50 to be conjunct with the energy applied to the outside, thereby preventing the accumulator 40 to vainly consume energy. This enables reduction of the sizes of the accumulator 40 and the oil hydraulic pump 53 as an example of the pump mechanism. Further, when work is applied from the outside to the hydraulic actuator 1 according to the first embodiment, this energy is regenerated for the accumulator 40 along with the movement of the oil in the high-pressure pipe 50, which reduces the energy consumed by the accumulator 40, thereby enabling reduction of the size of the oil hydraulic pump 53. Further, the valve mechanism 35, as an example of the control valve device, controls the rocking torque about the third axis such that the loads for operations of the servo motors 25a and 25b are reduced, which improves the responsivity of the servo motors 25a and 25b, thereby improving the controllability.

Further, while, in the first embodiment, the servo motors 25a and 25b are employed as the rocking-angle adjustment unit, the rocking-angle adjustment unit is not limited thereto, and it is also possible to employ a combination of an encoder and motors of other types, such as normal electromagnetic motors or ultrasonic motors, or rotational actuators which can be operated in an open loop manner, such as step motors. Further, instead of angle measurement using an encoder, it is also possible to employ measured values of the torque which acts on the rotational member 20 or the rotational shaft 28. In this case, it is possible to alleviate the influence of the variation of the pressure within the accumulator 40 or the variation of the torque about the Y' axis on the torque outputted from the rotational actuator 1, which is desirable.

In addition, while in the first embodiment, the controller 52 obtains the rotational angle of the rotational member 20 from the rotational angle of the rotational shaft 28, it is also possible to employ a structure capable of directly measuring the rotational angle of the rotational member 20. Further, while in the first embodiment, the torque about the center axes of the shafts 18a and 18b is made closer to 0 anytime, it is also possible to narrow the angular range within which the pressure control is performed, in the case where the servo motors 25a and 25b has extra performance, as compared with that in the case shown in FIGS. 4A to 4E. In this case, it is possible to suppress the energy consumption involved in the pressure control, which is desirable.

Figure 5:
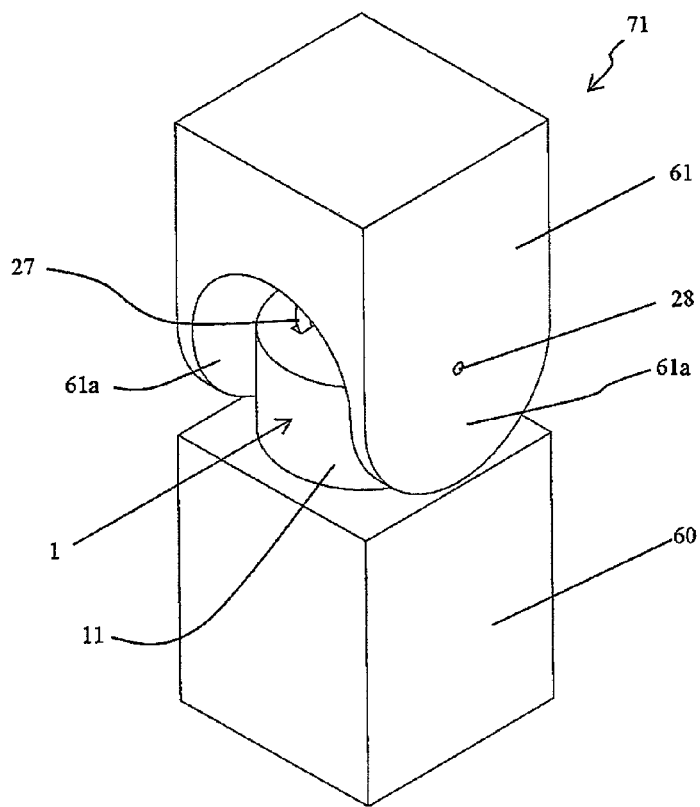
FIG. 5 is a perspective view illustrating the general outline of a joint driving unit employing the rotational actuator according to the first embodiment of the present invention.
Figure 6A:
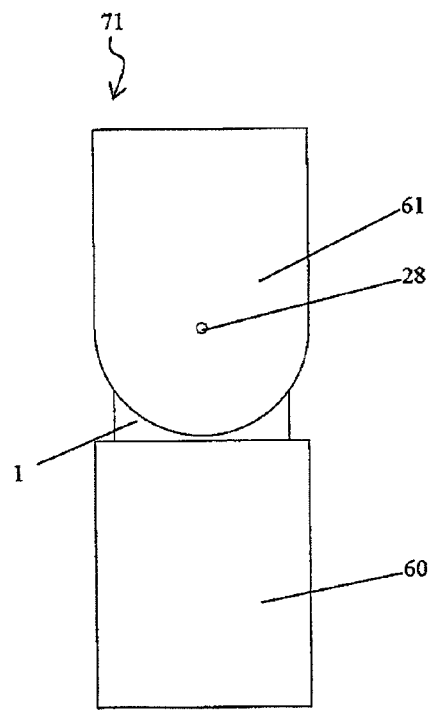
FIG. 6A is a side view illustrating the general outline of the joint driving unit employing the rotational actuator according to the first embodiment of the present invention.
Figure 6B:
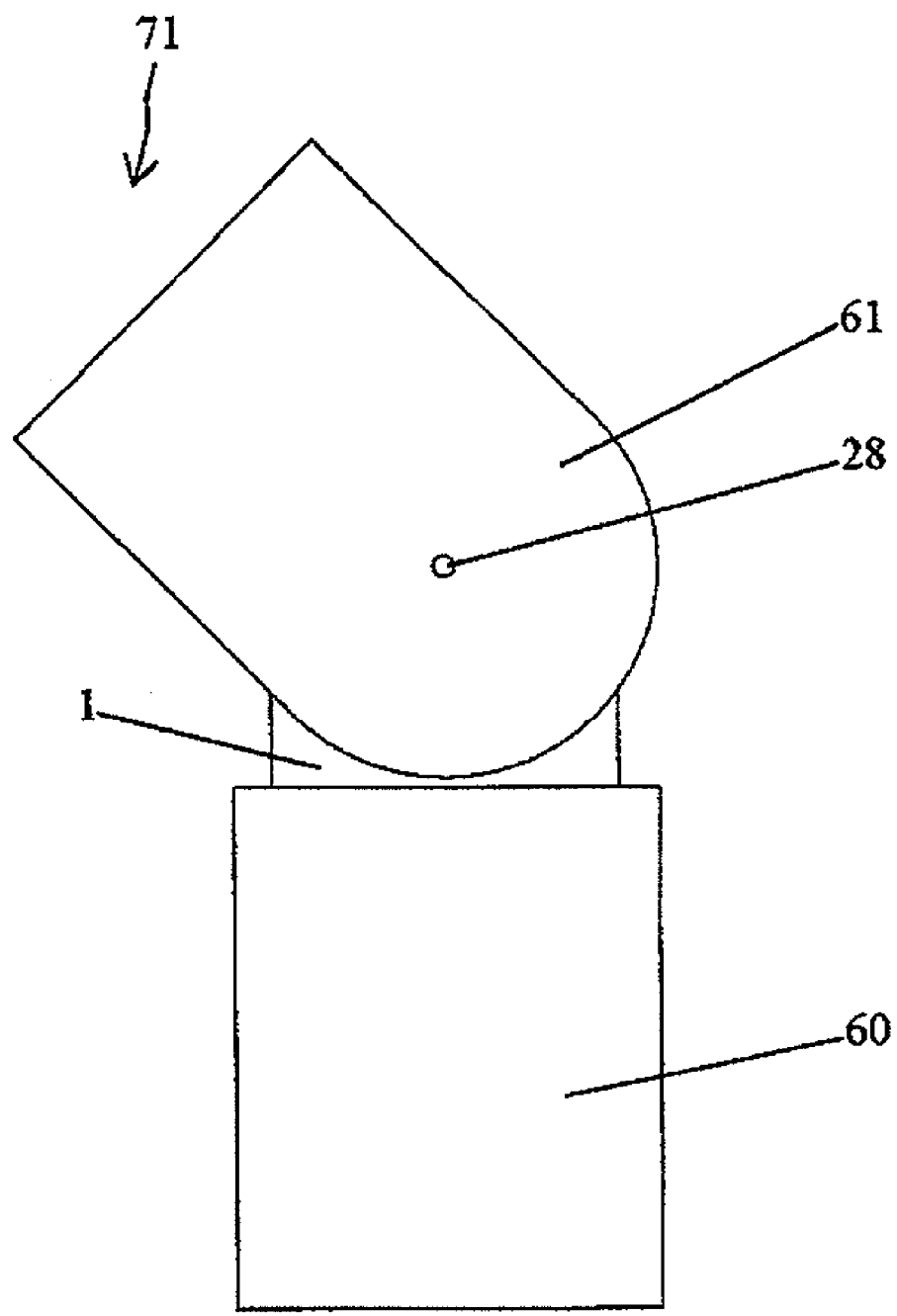
FIG. 6B is a side view illustrating the general outline of the joint driving unit employing the rotational actuator according to the first embodiment of the present invention.

Further, FIGS. 5 to 6B illustrate an example of the structure of the joint driving unit 71 employing the rotational actuator 1 according to the first embodiment. A first arm 60 is placed under the rotational actuator 1, a second arm 61 is placed thereabove, the frame 11 in the rotational actuator 1 is secured to the first arm 60, and the second arm 61 is directly secured to the rotational shaft 28 (more specifically, the rotational shaft 28 is secured at its opposite ends to protruded portions 61a of the second arm 61). That is, the joint driving unit 71 is used as a driving unit for rotationally driving the second arm 61 which is the upper arm, with respect to the first arm 60 which is the lower arm, through the rotational actuator 1.

With the structure, by operating the rotational actuator 1 for rotating the rotational shaft 28 in the counterclockwise direction from the state of FIG. 6A (a state where the center axis of the first arm 60 and the center axis of the second arm 61 are positioned on substantially the same straight line), it is possible to operate the second arm 61 to rotate in the counterclockwise direction with respect to the first arm 60, thereby realizing a state of FIG. 6B (a state where the center axis of the second arm 61 is inclined with respect to the center axis of the first arm 60). On the contrary, by rotating the rotational shaft 28 in the clockwise direction, it is possible to rotate the second arm 61 in the opposite direction from that of the case (that is, in the clockwise direction), with respect to the first arm 60.

Accordingly, with the structure, it is possible to provide the joint driving unit 71 which takes over the characteristic of the rotational actuator 1, that is, the characteristic of being excellent in operation efficiency, thereby realizing a joint driving unit for robot arms suitable for domestic applications, particularly. Specifically, in the case of FIG. 5, the first arm 61 and the second arm 60 are used as two arms in a robot arm which are coupled to each other through a joint portion, and the hydraulic actuator 1 is placed in the joint portion, such that, with respect to one arm (for example, the second arm 60) out of the two arms, the other arm (for example, the first arm 61) is driven by the joint driving unit 71, through the hydraulic actuator 1.

Figure 7:
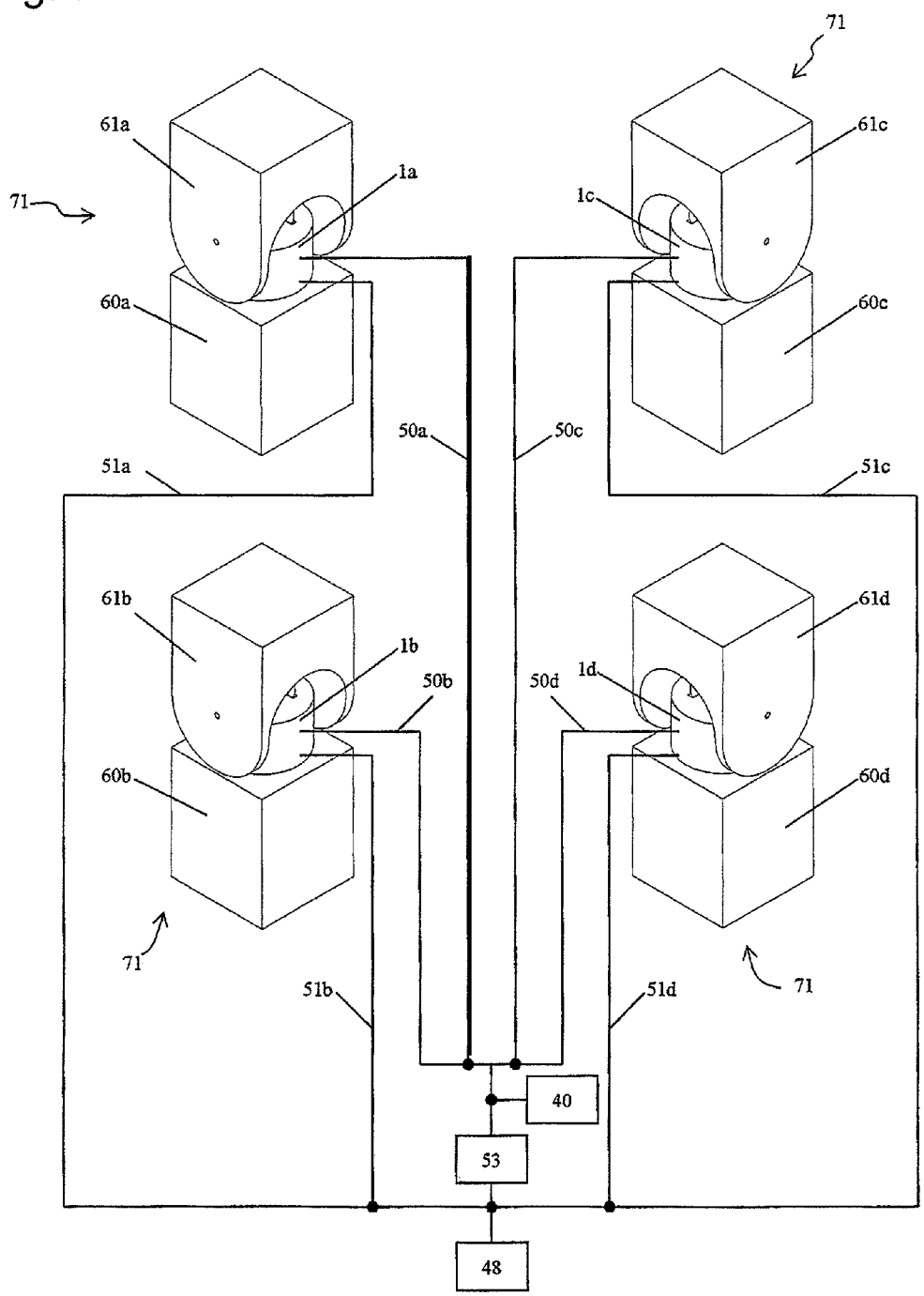
FIG. 7 is a view illustrating the structure which employs a plurality of the rotational actuators according to the first embodiment of the present invention and also employs a common oil hydraulic pump.

Further, it is also possible to provide a structure employing a single common oil hydraulic pump 53 as the respective oil hydraulic pumps for plural actuators 1a, 1b, 1c and 1d (for example, four actuators), as in FIG. 7. By doing this, it is possible to transfer, with respect to the plural high-pressure pipes 50a, 50b, 50c, and 50d, through the single oil hydraulic pump 53, oil from low-pressure pipes 51 (namely, low-pressure pipes 51a, 51b, 51c and 51d which connect the single oil hydraulic pump 53 to the rotational actuators 1a, 1b, 1c and 1d, respectively), which averages the variations in the required amounts of oils to be transferred thereto, thereby decreasing the variation in the amount of work by the oil hydraulic pump 53 with decreasing conjunction among the operations of the respective rotational actuators 1a, 1b, 1c and 1d. This enables reduction of the size of the entire structure of the oil hydraulic pump 53, which enables reduction of the weight of the pressurization unit (the pressurization unit such as the oil hydraulic cylinders 30a, 30b, 30c, 30d and 30e as an example of the rocking-torque generation mechanisms and the accumulator 40 as an example of the pressure accumulation mechanism). Further, the single common accumulator 40 is employed as accumulators in FIG. 7, and it is preferable to employ such a common accumulator, since it is possible to reduce the weight of the pressurization unit, provided that there is no problem in the placement of the common accumulator 40.

Further, arbitrary embodiments out of the above various embodiments can be properly combined to provide their respective effects.

INDUSTRIAL APPLICABILITY

The hydraulic actuator and the joint driving unit employing the same, according to the present invention are capable of facilitating control of force and, also, have an excellent power-to-weight ratio and, therefore, are usable as a joint driving actuator and the like for robots and a joint driving unit and the like employing the same.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A rotatable hydraulic actuator comprising:
   a base member;
   a swash member which is held with respect to the base member through a universal joint mechanism and is configured to be capable of rocking with respect to a first axis including a joint center of the universal joint mechanism being based on the base member;
   a first rotational member which is held rotatably with respect to the swash member about a second axis including the joint center of the universal joint mechanism being based on the swash member;
   a second rotational member which is held rotatably with respect to the first rotational member about a third axis being perpendicular to the second axis and including the joint center of the universal joint mechanism and is held rotatably about the first axis with respect to the base member;
   a high-pressure pipe portion filled with a non-compressible fluid being pressurized by a pressure accumulation mechanism;
   a low-pressure pipe portion filled with the non-compressible fluid while being maintained at a pressure lower than that of the non-compressible fluid in the high-pressure pipe portion;
   a pump mechanism which transfers the non-compressible fluid in the low-pressure pipe portion to the high-pressure pipe portion;
   a plurality of rocking-torque generation mechanisms which couple the base member and the swash member to each other and are driven by the non-compressible fluid to generate a rocking torque to the swash member, with the rocking-torque generation mechanisms being connected to the high-pressure pipe portion, the low-pressure pipe portion, and the pump mechanism;
   a control valve device which controls connection of the non-compressible fluid between the rocking-torque generation mechanisms and the high-pressure pipe portion as well as the low-pressure pipe portion; and
   a rocking-angle adjustment unit configured to change a relative angle between the first rotational member and the second rotational member about the third axis;
   wherein the control valve device controls such that the rocking-torque generation mechanisms generate the rocking torque about a fourth axis perpendicular to the first axis and the third axis, with respect to the swash member.

2. A joint driving unit comprising the hydraulic actuator according to claim 1 which is placed in a joint portion coupling two arms to each other, wherein, with respect to one of the two arms, the hydraulic actuator drives another of the arms.

3. The hydraulic actuator according to claim 1, wherein the universal joint mechanism is a constant-velocity joint mechanism.

4. A joint driving unit comprising the hydraulic actuator according to claim 3 which is placed in a joint portion coupling two arms to each other, wherein, with respect to one of the two arms, the hydraulic actuator drives another of the arms.

5. The hydraulic actuator according to claim 1, wherein the plurality of rocking-torque generation mechanisms are placed at equal intervals along a circumference about the second axis.

6. A joint driving unit comprising the hydraulic actuator according to claim 5 which is placed in a joint portion coupling two arms to each other, wherein, with respect to one of the two arms, the hydraulic actuator drives another of the arms.

7. The hydraulic actuator according to claim 1, wherein the rocking-torque generation mechanisms apply bidirectional rocking torques to the swash member.

8. A joint driving unit comprising the hydraulic actuator according to claim 7 which is placed in a joint portion coupling two arms to each other, wherein, with respect to one of the two arms, the hydraulic actuator drives another of the arms.

9. The hydraulic actuator according to claim 7, comprising an odd number of the rocking-torque generation mechanisms, the odd number being equal to or more than 3.

10. A joint driving unit comprising the hydraulic actuator according to claim 9 which is placed in a joint portion coupling two arms to each other, wherein, with respect to one of the two arms, the hydraulic actuator drives another of the arms.

11. The hydraulic actuator according to claim 9, wherein a pressure of the non-compressible fluid which acts on the rocking-torque generation mechanisms, except the rocking-torque generation mechanism closest to the fourth axis, is a pressure of the non-compressible fluid in the high-pressure pipe portion or a pressure of the non-compressible fluid in the low-pressure pipe portion.

12. A joint driving unit comprising the hydraulic actuator according to claim 11 which is placed in a joint portion coupling two arms to each other, wherein, with respect to one of the two arms, the hydraulic actuator drives another of the arms.

13. The hydraulic actuator according to claim 1, wherein the rocking-torque generation mechanisms are piston-cylinder mechanisms.

14. A joint driving unit comprising the hydraulic actuator according to claim 13 which is placed in a joint portion coupling two arms to each other, wherein, with respect to one of the two arms, the hydraulic actuator drives another of the arms.

15. The hydraulic actuator according to claim 13, wherein the piston-cylinder mechanisms are mechanisms employing double-rod type pistons.

16. A joint driving unit comprising the hydraulic actuator according to claim 15 which is placed in a joint portion coupling two arms to each other, wherein, with respect to one of the two arms, the hydraulic actuator drives another of the arms.

17. The hydraulic actuator according to claim 1, wherein the rocking-torque generation mechanisms and the swash member are coupled to each other through ball joint mechanisms, and joint centers of the ball joint mechanisms exist in a plane being perpendicular to the second axis and including the third axis.

18. A joint driving unit comprising the hydraulic actuator according to claim 17 which is placed in a joint portion coupling two arms to each other, wherein, with respect to one of the two arms, the hydraulic actuator drives another of the arms.

19. A multi-axes hydraulic actuator comprising a plurality of hydraulic actuators identical with that according to claim 1, wherein the respective hydraulic actuators share the common pump mechanism.

20. A joint driving unit comprising the hydraulic actuator according to claim 19 which is placed in a joint portion coupling two arms to each other, wherein, with respect to one of the two arms, the hydraulic actuator drives another of the arms.

\* \* \* \* \*